(12) United States Patent
Alvin et al.

US006913736B2

(10) Patent No.: US 6,913,736 B2
(45) Date of Patent: Jul. 5, 2005

(54) METAL GAS SEPARATION MEMBRANE MODULE DESIGN

(75) Inventors: Mary Anne Alvin, Pittsburgh, PA (US); Gerald J. Bruck, Murrysville, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 501 days.

(21) Appl. No.: 09/952,186

(22) Filed: Sep. 13, 2001

(65) Prior Publication Data

US 2002/0141920 A1 Oct. 3, 2002

Related U.S. Application Data

(63) Continuation-in-part of application No. 09/822,927, filed on Mar. 30, 2001.

(51) Int. Cl.⁷ .............................. B01J 8/00; B01D 53/22
(52) U.S. Cl. ............................................. 422/211; 96/11
(58) Field of Search ................................. 422/211, 222; 95/55, 56, 116; 96/4, 8, 10, 11; 423/210, 248

(56) References Cited

U.S. PATENT DOCUMENTS

| | | | |
|---|---|---|---|
| 2,824,620 A | | 2/1958 | De Rosset |
| 2,848,620 A | | 8/1958 | Backus |
| 2,958,391 A | | 11/1960 | De Rosset |
| 3,022,187 A | * | 2/1962 | Eyrand et al. ............... 428/545 |
| 3,135,591 A | * | 6/1964 | Jones ............................ 95/53 |
| 3,208,198 A | | 9/1965 | Rubin |
| 3,241,298 A | | 3/1966 | Pierce |
| 3,245,206 A | | 4/1966 | Bonnet |
| 3,251,173 A | | 5/1966 | Ehlers et al. |
| 3,392,510 A | | 7/1968 | Koch, Jr. |
| 3,413,777 A | | 12/1968 | Langley |
| 3,477,288 A | | 11/1969 | Krcal et al. |
| 3,713,270 A | | 1/1973 | Farr et al. |
| 3,794,468 A | * | 2/1974 | Leonard ...................... 422/48 |
| 4,039,703 A | | 8/1977 | Kamijo et al. |
| 4,132,660 A | | 1/1979 | Christian et al. |
| 4,132,668 A | | 1/1979 | Gryaznov et al. |
| 4,472,175 A | | 9/1984 | Malon et al. |
| 4,496,373 A | | 1/1985 | Behr et al. |
| 4,589,891 A | | 5/1986 | Iniotakis et al. |
| 4,689,150 A | | 8/1987 | Abe et al. |
| 4,699,637 A | | 10/1987 | Iniotakis et al. |
| 4,711,719 A | | 12/1987 | Leenaars et al. |
| 4,857,080 A | | 8/1989 | Baker et al. |
| 4,865,630 A | * | 9/1989 | Abe ............................. 96/11 |
| 4,880,441 A | | 11/1989 | Kesting et al. |
| 4,971,696 A | | 11/1990 | Abe et al. |
| 5,015,269 A | | 5/1991 | Garrett et al. |
| 5,139,540 A | | 8/1992 | Najjar et al. |
| 5,139,541 A | | 8/1992 | Edlund |
| 5,205,841 A | | 4/1993 | Vaiman |
| 5,217,506 A | | 6/1993 | Edlund et al. |
| 5,259,870 A | | 11/1993 | Edlund |
| 5,310,414 A | | 5/1994 | Najjar et al. |
| 5,342,431 A | * | 8/1994 | Anderson et al. ............... 95/45 |
| 5,358,553 A | | 10/1994 | Najjar et al. |
| 5,376,167 A | | 12/1994 | Broutin et al. |
| 5,384,101 A | | 1/1995 | Rockenfeller |
| 5,393,325 A | | 2/1995 | Edlund |
| 5,415,891 A | | 5/1995 | Liu et al. |
| 5,451,386 A | * | 9/1995 | Collins et al. .............. 423/237 |
| 5,468,283 A | | 11/1995 | French et al. |
| 5,487,774 A | | 1/1996 | Peterson et al. |
| 5,498,278 A | | 3/1996 | Edlund |
| 5,518,530 A | | 5/1996 | Sakai et al. |
| 5,599,383 A | | 2/1997 | Dyer et al. |
| 5,738,708 A | | 4/1998 | Peachey et al. |
| 5,782,959 A | | 7/1998 | Yang et al. |
| 5,782,960 A | | 7/1998 | Ogawa et al. |
| 5,810,912 A | | 9/1998 | Akiyama et al. |
| 5,827,569 A | | 10/1998 | Akiyama et al. |
| 5,891,222 A | | 4/1999 | Hilgendorff et al. |
| 5,904,754 A | | 5/1999 | Juda et al. |
| 5,931,987 A | | 8/1999 | Buxbaum |
| 5,938,822 A | | 8/1999 | Chen et al. |
| 5,955,044 A | | 9/1999 | Lucht et al. |
| 5,980,989 A | | 11/1999 | Takahashi et al. |
| 5,989,319 A | | 11/1999 | Kawae et al. |
| 5,997,614 A | * | 12/1999 | Tuma et al. ...................... 96/4 |
| 6,010,560 A | | 1/2000 | Witzko et al. |
| 6,066,592 A | | 5/2000 | Kawae et al. |
| 6,083,297 A | | 7/2000 | Valus et al. |
| 6,083,390 A | | 7/2000 | Hartmann |
| 6,139,810 A | | 10/2000 | Gottzmann et al. |
| 6,152,987 A | | 11/2000 | Ma et al. |
| 6,171,574 B1 | | 1/2001 | Juda et al. |
| 6,171,712 B1 | | 1/2001 | Thornton |
| 6,183,542 B1 | | 2/2001 | Bossard |
| 6,183,543 B1 | | 2/2001 | Buxbaum |
| 2001/0013272 | * | 8/2001 | Blase et al. ...................... 96/8 |

* cited by examiner

Primary Examiner—Kevin P. Kerns

(57) ABSTRACT

An improved metal gas separation membrane for separating hydrogen from a gas steam includes a quantity of metal particles that are bonded together to form a porous body. The porous body may have a porosity that increases from a first surface to an opposite second surface and may additionally include a coating of ceramic particles on the first surface. The metal gas separation membrane may include a coating of a dense precious metal applied thereto that is permeable by hydrogen via chemisorption-dissociation-diffusion. The porous body may include a catalytic enhancement. Also disclosed are three gas separation modules that employ the metal gas separation membrane disposed within a core of the gas separation module for separating hydrogen from a gas stream. The gas separation membranes are each supported on a first mounting member and a second mounting member. The gas separation modules may also include a catalytic enhancement.

18 Claims, 4 Drawing Sheets

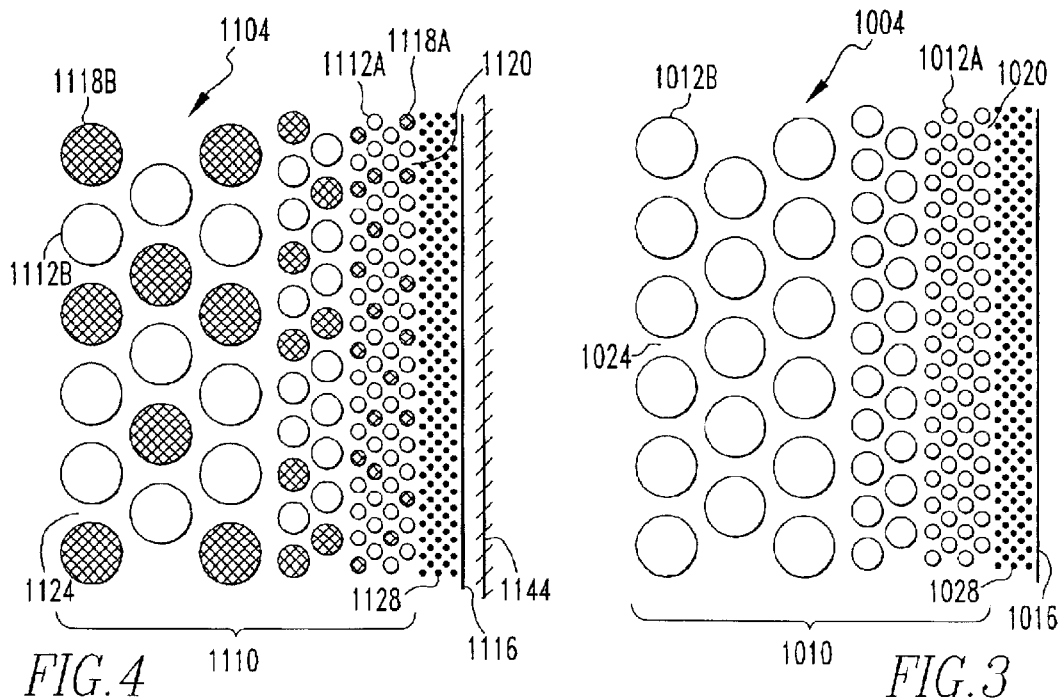
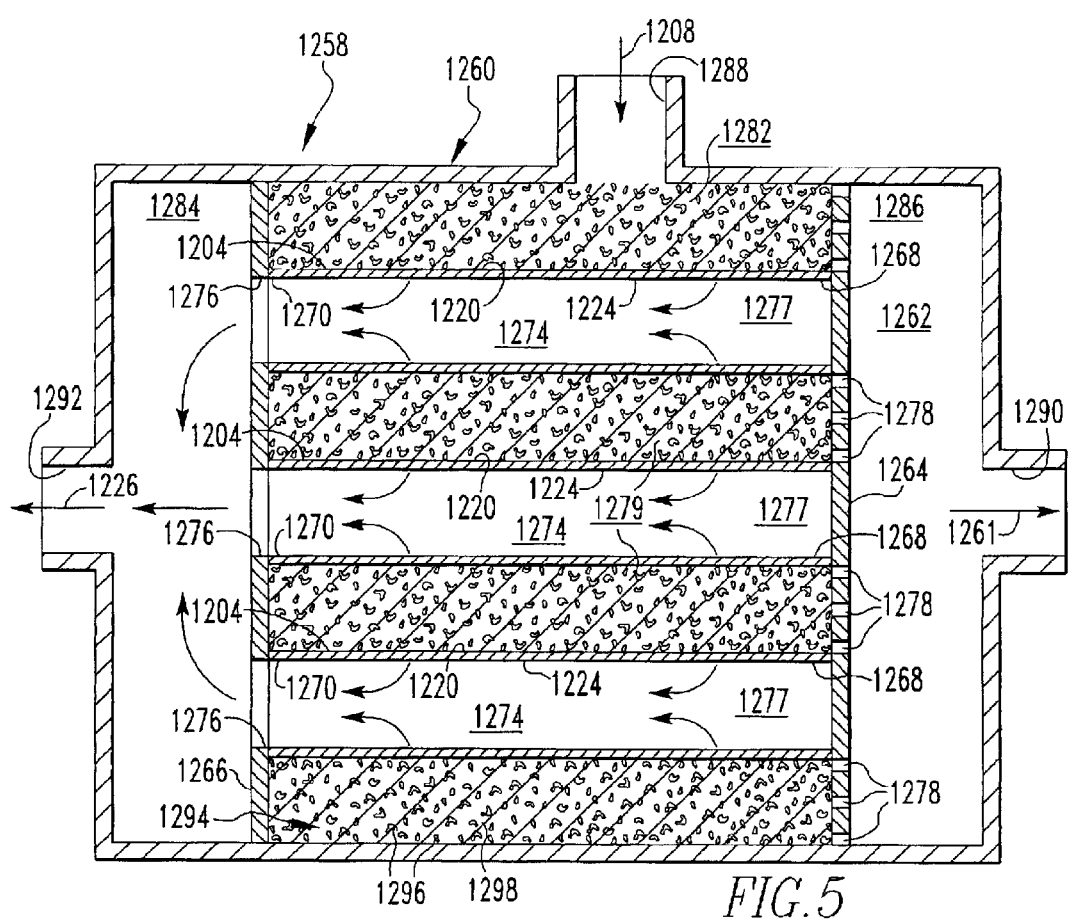

METAL GAS SEPARATION MEMBRANE MODULE DESIGN

CROSS REFERENCED TO RELATED APPLICATION

This application is a continuation-in-part application of commonly assigned U.S. patent application Ser. No. 09/822,927 filed Mar. 30, 2001, and entitled "Metal Gas Separation Membrane.

BACKGROUND OF THE INVENTION

1. Field of the Invention

The present invention relates generally to gas separation modules and, more particularly, to a gas separation module for the separation of hydrogen gas from a gas stream.

2. Description of the Related Art

Membranes and membrane modules for the separation of hydrogen from other gases are generally known. In particular, useful membranes for hydrogen separation typically can be categorized as being of four general types: (i) polymeric, (ii) porous inorganic, (iii) self-supporting non-porous metal, and (iv) non-porous metal supported on a porous rigid matrix such as metal or ceramic.

Porous inorganic-based membranes are typically fabricated from titania, zirconia, alumina, glass, molecular sieving carbon, silica and/or zeolites. All are fabricated with a narrow pore size distribution, with the porous inorganic membranes exhibiting high hydrogen permeability but low selectivity due to relatively large mean pore diameters. Such materials are brittle and thus susceptible to failure due to cracking, and the sealing and fixturing of such porous inorganic-based membranes limit their use to relatively low temperature applications.

Development of supported metal membranes has focused on the utilization of ceramic tubes coated with a thin adherently bonded film or foil of non-porous or dense palladium (Pd) or Pd-alloys. The ceramic support tube typically is of a graded porosity from one surface thereof to a second opposite surface. More specifically, the porosity of the ceramic support tube typically is at its least at the surface upon which the Pd or Pd-alloy is disposed, and the porosity of the tube increases from this surface to a maximum porosity on the surface opposite the layer of Pd. The layer of Pd or Pd-alloy is selectively permeable to hydrogen gas and is typically capable of withstanding temperatures of 1500–1600° F. (815–870° C.).

Such ceramic-supported metal membranes are typically housed in shell and tube modules and are fitted with compression gaskets to seal the membrane tube into the module to prevent leakage of the feed gas stream into the permeate gas stream. Potential leak paths between the feed and permeate gas streams can exist due to differences in the coefficients of thermal expansion of the ceramic tube and the metal compression fittings. Additionally, the ceramic support tubes are inherently brittle and can experience long-term thermal fatigue due to repetitive process or system start-up and shutdown cycles.

The mechanical adherence of the thin Pd or Pd-alloy layer upon the surface of the ceramic support tube requires secure attachment of the film or foil onto the surface of the ceramic, as well as the absence of pinholes or other mechanical rupturing that can occur during manufacture or use of the ceramic tube membrane.

For porous metal membranes such as porous stainless steel, Knudsen diffusion or combined Knudsen diffusion/surface diffusion are the primary mechanisms by which gas transport occurs across the membrane. For dense metal membranes such as Pd or Pd-alloy foil or film, however, the primary mechanism of gas transport through the metal layer is traditional chemisorption-dissociation-diffusion. Broadly stated, chemisorption-dissociation-diffusion transport involves chemisorption of hydrogen molecules onto the membrane surface, dissociation of hydrogen atoms into protons and electrons, transportation of the protons and electrons through the dense metal, reassociation of the protons and electrons into hydrogen molecules, and desorption of hydrogen molecules from the media. While Knudsen diffusion typically offers greater flow rates across a membrane than chemisorption-dissociation-diffusion, Knudsen diffusion suffers from reduced hydrogen selectivity as compared with chemisorption-dissociation-diffusion.

It is also known that the interaction of a gas stream with catalytic materials can increase the concentration of hydrogen within the reactant or process gas stream. Such catalytic materials enhance the water gas shift reaction whereby carbon monoxide is reacted with water to form carbon dioxide and hydrogen gas. Catalytic materials also promote the decomposition of ammonia which also increases the concentration of hydrogen.

Examples of such catalytic materials include platinum (Pt), palladium (Pd), rhodium (Rh), ruthenium (Ru), nickel (Ni), iridium (Ir), and the like. While it has been known to apply such catalytic materials to ceramic support substrates to form composite membranes, such composite membranes still suffer from the aforementioned problems associated with the application of Pd and Pd-alloy foils and films to ceramic support tubes.

The problems inherent in forming a highly gas specific membrane that is capable of withstanding elevated temperatures are similarly inherent in designing a module that incorporates such membranes. In order to maintain separation between a feed gas stream and a permeate gas stream, it is necessary to provide seals or sealing structures that effectively isolate the feed gas stream from the permeate gas stream. Mechanical and thermal stresses resulting from different coefficients of thermal expansion and elevated temperatures greatly impair the ability of most known sealing systems to effectively isolate the feed gas stream from the permeate gas stream.

It is thus desired to provide a hydrogen gas separation membrane and module having high hydrogen selectivity that overcomes the aforementioned problems associated with the application of Pd and Pd-alloys to ceramic support tubes. It is also desired to provide such a membrane and module that include a catalytic enhancement incorporated therein.

SUMMARY OF THE INVENTION

In view of the foregoing, an improved gas separation module for separating hydrogen from a gas steam includes a metal gas separation membrane having a quantity of metal particles in the form of fibers and/or powders that are compacted together and bonded with one another to form a porous body that is selectively permeable to hydrogen. The porous body may be of a constant porosity throughout or may have a porosity that is "graded," i.e., increases from a first surface to a second opposite surface. A porous body having a graded porosity advantageously provides a low porosity (and thus consequent higher hydrogen selectivity) at the first surface without the higher pressure drop that would be experienced by the hydrogen from the second surface to the first surface if the porous body had the same low porosity throughout its cross section. This variation in porosity can result from the use of metal particles in the form of fibers and/or powders that gradually increase in size in going from the first surface to the second surface, or may result from the use of the same size particles that are compacted to a relatively lesser degree in going from the first surface to the second surface.

The metal gas separation membrane may additionally include a coating of ceramic particles on the first surface thereof to further decrease the porosity at the first surface. Alternatively, or in addition thereto, the metal gas separation membrane may include a thin adherently bonded foil or coating of a dense precious metal such as palladium, palladium-alloys, and the like applied thereto that is permeable by hydrogen according to a chemisorption-dissociation-diffusion transport phenomenon.

Still alternatively, or in addition thereto, the gas separation module may include a catalytic enhancement that can interact with a feed gas stream to increase the concentration or quantity of hydrogen in the feed gas stream according to various catalytic reactions such as the water gas shift reaction and the ammonia decomposition reaction. The catalytic enhancement can be in the nature of catalytic materials that are dispersed throughout the porous body, that are supported on scaffold apparatuses such as metal fibers and chemical vapor infiltration silicon carbide (CVI-SiC) reticulated foam, that are coated on the metal particles that make up the porous body, that are in the form of a layer on a surface of the porous body with or without the addition of a ceramic washcoat therebetween, or can be in the form of an application of perovskite, zeolite, or spinel structures to the porous body.

The gas separation module includes a plurality of metal gas separation membranes and a housing having first and second mounting members in the form of tube sheets. The metal gas separation membranes are supported on the first and second mounting members. The metal gas separation membranes can advantageously be fixedly mounted, such as by being welded, to the tube sheets to sealingly mount the metal gas separation members to the tube sheets.

BRIEF DESCRIPTION OF THE DRAWINGS

FIG. 3 is a schematic cross-sectional view of a third embodiment of a gas separation membrane in accordance with the present invention;

FIG. 4 is a schematic cross-sectional view of a fourth embodiment of a gas separation membrane in accordance with the present invention;

FIG. 5 is a schematic cross-sectional view of a first embodiment of a gas separation module in accordance with the present invention;

DESCRIPTION OF THE PREFERRED EMBODIMENTS

Figure 1:
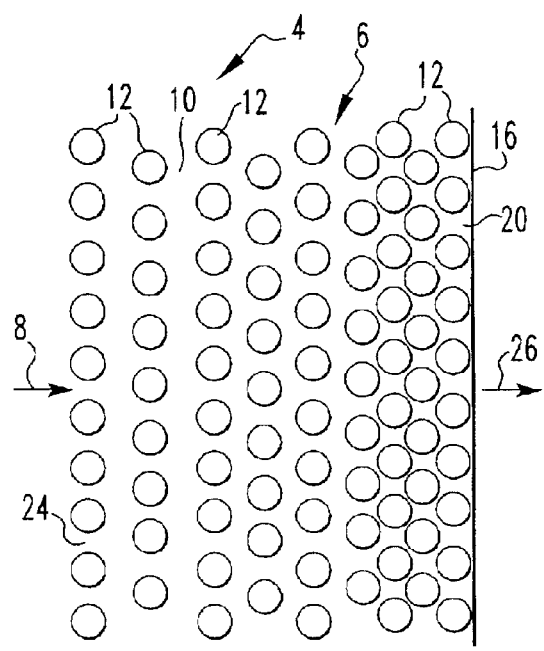
FIG. 1 is a schematic cross-sectional view of a first embodiment of a gas separation membrane in accordance with the present invention.

A first embodiment of a metal gas separation membrane 4 in accordance with the present invention is indicated generally in FIG. 1. The metal gas separation membrane 4 is advantageously configured to separate hydrogen gas from a gas stream 8.

The metal gas separation membrane 4 includes a transmission member 6 and can be of numerous shapes, such as plates, tubes, honeycomb configurations, and other such shapes. The transmission member 6 is depicted schematically in cross-section FIG. 1, and it includes a porous body 10 made out of a plurality of metal particles 12 compressed and bonded together and a metal coating 16 on the porous body 10. The porous body 10 includes a first surface 20 and a second surface 24 opposite one another with the metal coating 16 being disposed on the first surface 20.

Figure 1A:
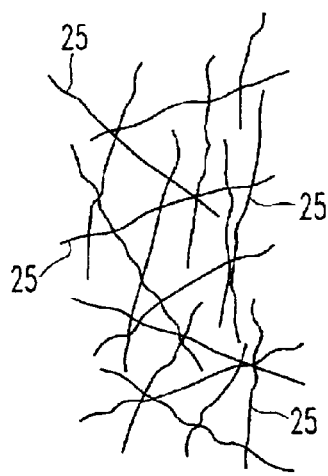
FIG. 1A is a schematic representation of a portion of the first embodiment.

The metal particles 12 that make up the porous body 10 can be of numerous physical configurations such as metal fibers, metal powder, and other shapes, and the porous body 10 can be made up of one type of particle or combinations of these different-shaped metal particles 12. FIG. 1A schematically depicts an example of a portion of a porous body 10 that includes a quantity of metal fibers 25. The metal particles 12 can be fabricated from known metals, superalloys, and/or intermetallic materials to permit the porous body 10 to withstand high temperatures, meaning not only that the material does not melt at the elevated temperatures but also that the material resists corrosion in the potentially oxidizing or reducing environment in which the membrane 4 is used.

The metal particles 12 are compacted and sinter bonded to form a thin, dense member of material that makes up the porous body 10. The resultant porous body 10 has a thickness that is in the range of about 100 microns to 5 millimeters, and preferably in the range of about 0.5 millimeters (500 microns) to 2 millimeters, although other thicknesses may be appropriate depending upon the specific needs of the particular application. In the circumstance where the porous body 10 is an elongated substantially cylindrical member formed with an elongated void, the outer diameter of the porous body 10 may be in the range of about 5 to 15 millimeters, and preferably is in the range of about 5 to 8 millimeters.

As can be seen in FIG. 1, the porosity of the porous body 10 is greater at the second surface 24 than at the first surface 20, meaning that the space between adjacent metal particles 12 near the second surface 24 is greater than the space between adjacent metal particles 12 near the first surface 20. Alternatively, the porous body 10 can be said to have a density that decreases in a direction from the first surface 20 toward the second surface 24. The porous body 10 depicted in FIG. 1 thus can be said to have a graded porosity.

As will be set forth more fully below, the porous body 10 is advantageously configured to provide relatively high hydrogen selectivity at the first surface 20 due to its relatively low porosity there. The regions of the porous body extending from the first surface 20 to the second surface 24, being relatively more porous than the first surface 20, have a relatively lower hydrogen selectivity but correspondingly permit the relatively free flow of gases therethrough. These relatively porous regions of the porous body 10 can thus be said to provide support to the low-porosity region of the porous body 10 at the first surface 20, which generally is relatively thin and of lower strength, without meaningfully impeding the flow of hydrogen therethrough from the second surface 24 to the first surface 20. As such, the graded porosity feature of the porous body 10 itself provides both high hydrogen selectivity and high hydrogen flow rates therethrough without the high pressure drop that would be experienced by the hydrogen if the porosity of the porous body 10 were that of the first surface 20 throughout the porous body 10.

As indicated hereinbefore, the metal particles 12 can include a quantity of metal fibers. Such fibers advantageously provide good mechanical strength at lower density (as compared with metal powder particles) due to the higher aspect ratio of the fibers (the ratio of the length to the width) as well as due to the multiple joints by which each fiber is connected with other metal particles 12.

As is shown in FIG. 1, the metal particles 12 are all of substantially the same size, and the variation in porosity between the first and second surfaces 20 and 24 results from compacting the metal particles 12 to a greater degree at the first surface 20 than at the second surface 24. In this regard, the porous body 10 can be manufactured out of several layers of metal particles 12, with each layer being compacted to a different degree, or other appropriate methodologies can be employed such as forming each layer out of a slurry of metal particles that are sequentially sprayed, painted, or centrifuged onto a surface, with the layers being sprayed, painted, or centrifuged to different degrees.

The metal coating 16 is a thin dense adherently bonded layer or foil of a precious metal such as palladium (Pd), palladium alloys, and the like that enhance gas phase chemisorption-dissociation-diffusion of hydrogen therethrough. Such palladium alloys may include palladium—copper (Pd—Cu), palladium—ruthenium (Pd—Ru), and other alloys. As is know in the relevant art, the expression gas phase "chemisorption-dissociation-diffusion" of hydrogen refers to molecular chemisorption and dissociation of hydrogen along the high pressure side of the metal coating 16, proton and electron diffusion through the lattice of the metal coating 16, and proton and electron reassociation and recombination and desorption of molecular species along the opposite side of the metal coating 16. The metal coating 16 thus can be referred to as a chemisorption-dissociation-diffusion coating. The metal coating 16 can be applied to the porous body 10 in any of a variety of fashions such as via electroless plating, electroless plating with osmosis, electroplating, sputtering, electrodeposition, and the like.

In the embodiment depicted in FIG. 1, the metal gas separation membrane 4 receives the gas stream 8 against the second surface 24 and separates hydrogen from the gas stream 8 to form a permeate stream 26 of high purity hydrogen gas that flows out of the side of the metal coating 16 opposite the porous body 10. In alternate embodiments (not depicted,) the overall gas flow may be in a reverse direction to that depicted generally in FIG. 1, i.e., the gas stream 8 may flow directly against the metal coating 16 such that the permeate stream 26 would flow out of the second surface 24.

By way of example, the metal particles 12 may be in the form of fibers selected to be of a size in the range of about <1 to 50 microns in diameter and generally less than 10 millimeters in length and are compacted to an appropriate degree to permit the flow of gases therethrough. Hydrogen that passes through the porous body 10 and reaches the first surface 20 is then permitted to flow through the metal coating 16 primarily by chemisorption-dissociation-diffusion.

The metal coating 16 is preferably configured to be as thin as possible to enhance the flow rate of hydrogen therethrough. The thickness of the metal coating 16 is thus preferably in approximately the range of 0.1 to 10 microns.

It can thus be seen that the porous body 10 serves to mechanically support the metal coating 16 thereon. In this regard, it can be seen that the metal particles 12 provide numerous points of contact between the porous body 10 and the metal coating 16, which helps the metal coating 16 to adhere onto the porous body 10 during operation of the metal gas separation membrane 4 and during the thermal expansion and contraction of the metal gas separation membrane 4 during start-up and shut-down operations.

In its simplest form, the metal gas separation membrane could comprise solely a porous body being manufactured out of metal particles and having a constant density and porosity throughout, with the porous body serving as the transmission member that separates hydrogen from a gas stream. In addition, the porous body may be of a graded density to reduce the pressure drop across the porous body 10 and/or can additionally include the metal coating 16 to further increase hydrogen selectivity.

Figure 2:
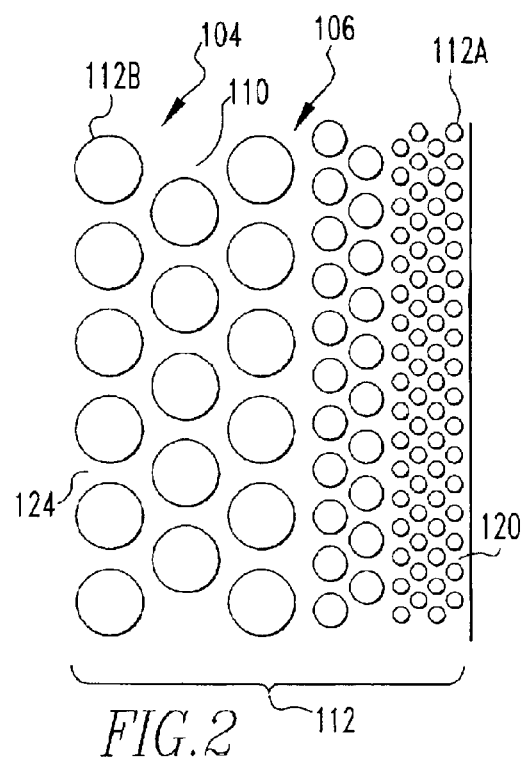
FIG. 2 is a schematic cross-sectional view of a second embodiment of a gas separation membrane in accordance with the present invention.

A second embodiment of a metal gas separation membrane 104 is indicated generally in FIG. 2. The metal gas separation membrane 104 includes a transmission member 106 having a porous body 110 in which the graded porosity thereof is achieved by providing metal particles 112 that vary in size from relatively finer metal particles 112A at the first surface 120 to relatively coarser metal particles 112B at the second surface 124.

By way of example, the relatively finer metal particles 112A may be in the form of fibers of a size in the range of about 25 to 100 nanometers in diameter and <1 to 5 millimeters in length, and the relatively coarser particles 112B may be in the form of fibers of a size in the range of about <1 to 50 microns in diameter and <10 millimeters in length.

A third embodiment of a metal gas separation membrane 1004 in accordance with the present invention is indicated generally in FIG. 3. The metal gas separation membrane 1004 is similar to the metal gas separation membranes set forth above and includes a porous body 1010 having a first surface 1020 and a second surface 1024 opposite one another, a layer of ceramic particles 1028 disposed on the first surface 1020, and a chemisorption-dissociation-diffusion coating 1016 disposed on the layer of ceramic particles 1028. The porous body 1010 is of a graded porosity that results from the use of metal particles of varying sizes that range from relatively finer metal particles 1012A disposed at the first surface 1020 to relatively coarser metal particles 1012B disposed at the second surface 1024.

The metal gas separation membrane 1004 may be of a hollow, generally cylindrical configuration, although other configurations such as those set forth above, may be employed without departing from the concept of the present invention. In such a hollow cylindrical configuration, the outer diameter of the metal gas separation membrane 1004 may be in the range of about 5 to 15 millimeters, and preferably in the range of about 5 to 8 millimeters, although the outer diameter may be larger or smaller than that set forth herein. The wall thickness of the porous body 1010 may be in the range of about 0.1 millimeters (100 microns) to 5 millimeters, and preferably in the range of about 0.5 millimeters (500 microns) to 2 millimeters, and such wall thickness is generally defined as the distance between the first surface 1020 and the second surface 1024.

The layer of ceramic particles 1028 may be of a thickness less than 50 microns and preferably in the range of about than 10 microns to 12 microns, and the pore size thereof may be less than about 5 nanometers. The ceramic particles 1028 may be of a size in the range of about 25 to 100 nanometers and may include materials such as $Al_2O_3$, $TiO_2$, $Al_2O_3$—$TiO_2$, and $ZrO_2$ although other materials may be employed.

The chemisorption-dissociation-diffusion coating 1016 may be of a thickness of approximately less than 10 microns and may be made up of particles sized in the range of about less than 0.01 microns to 0.02 microns. The chemisorption-dissociation-diffusion coating 1016 is made of known proton conducting media such as palladium (Pd) and alloys thereof such as palladium—copper (Pd—Cu) and palladium—ruthenium (Pd—Ru), although other known proton conducting media including those set forth above may be employed without departing from the concept of the present invention.

The porous body 1010 may be made up of known materials such as FeAl, Haynes® 160 (available from Haynes International of Kokomo, Ind. 46904, USA), RA-333® or RA85H® (available from Rolled Alloys, Temperance, Mich. 48182, USA), 602CA, and Fecralloy, although other materials including those set forth above may be employed. The size range of the finer and coarser metal particles 1012A and 1012B may be the same as that set forth above or may be of other sizes depending upon the specific needs of the particular application.

A fourth embodiment of a metal gas separation membrane 1104 in accordance with the present invention is indicated generally in FIG. 4. The metal gas separation membrane 1104 is similar to the metal gas separation 1004 but includes a porous body 1110 having a catalytic enhancement in the form of particles of catalytic material that range in size from relatively finer particles of catalytic material 1118A disposed at the first surface 1120 to relatively coarser particles of catalytic material 1118B disposed at the second surface 1124 in a fashion similar to the relatively finer and coarser metal particles 1112A and 1112B. The particles of catalytic material 1118A and 1118B are particles of precious metal such as platinum (Pt), palladium (Pd), rhodium (Rh), ruthenium (Ru), nickel (Ni), iridium (Ir), and alloys thereof and are depicted in FIG. 4 as being shaded. The particles of catalytic material 1118A and 1118B promote the water gas shift reaction, the ammonia decomposition reaction, and the like in a known fashion to increase the concentration or availability of hydrogen. Alternately, fine catalytic particles of uniform size can be dispersed throughout the porous body 1110 and/or a layer of ceramic particles 1128 disposed against the first surface 1120, and may coat or be adhered to the metal and/or the ceramic particles. The metal gas separation membrane 1104 additionally includes a support member 1144 disposed against the chemisorption-dissociation-diffusion coating 1116. It is understood that the metal gas separation membranes 4, 104, and 1004 can be catalytically enhanced in any of the fashions set forth above and/or can include the support member 1144.

The metal gas separation membrane 1104 may be employed in an environment in which a gas stream flows against or along the second surface 1124 and into the porous body 1110 where it catalytically interacts with the particles of catalytic material 1118A and 1118B. Hydrogen gas then flows through the layer of ceramic particles 1128 and passes through the chemisorption-dissociation-diffusion coating 1116 in a fashion set forth above.

The support member 1144 retains the chemisorption-dissociation-diffusion coating 1116 and the layer of ceramic particles 1128 disposed on the porous body 1110 when gas flows through the porous body 1110 prior to contacting the chemisorption-dissociation-diffusion coating 1116. In this regard, the support member 1144 helps to resist the chemisorption-dissociation-diffusion coating 1116 and the layer of ceramic particles 1128 from being blown away from or becoming otherwise dislodged from the porous body 1110 as a result of the substantial pressure drop in going from the second surface 1124 to the outermost portions of the chemisorption-dissociation-diffusion coating 1116. The support member 1144 may be in the form of a metal mesh, a screen, a densified perforated sleeve, as well as other appropriate configurations.

A first embodiment of a gas separation module 1258 in accordance with the present invention is indicated generally in FIG. 5. The gas separation module 1258 includes a housing 1260 within which are disposed a plurality of metal gas separation membranes 1204 in accordance with the present invention. While the metal gas separation membranes 1204 employed in the gas separation module 1258 may be the metal gas separation membranes 1004, it is understood that any of the metal gas separation membranes set forth herein may be employed in the gas separation module 1258 without departing from the concept of the present invention.

In general terms, the gas separation module 1258 can be stated as being structured to receive a feed gas stream 1208 and to separate it into a permeate gas stream 1226 and a retentate gas stream 1261. While the permeate gas stream 1226 may be high purity hydrogen gas, it is understood that the gas separation module 1258 potentially could be configured such that the permeate gas stream 1226 is another gas such as oxygen.

The housing 1260 is a generally hollow member formed with a core 1262, within which are disposed a first mounting member 1264 and a second mounting member 1266. The first and second mounting members 1264 and 1266 are in the form of first and second tube sheets.

Each metal gas separation membrane 1204 is an elongated substantially cylindrical member having a first end 1268 and an opposite second end 1270 and being formed with an elongated void 1274 formed therein and extending substantially throughout the longitudinal extent of the metal gas separation membrane 1204. Each metal gas separation membrane 1204 includes a first surface 1220 and a second surface 1224, with the second surface 1224 being defined by the void 1274. For purposes of clarity, the metal gas separation membranes 1204 shown in FIG. 5 do not depict a layer of ceramic particles, a chemisorption-dissociation-diffusion coating, or a support member, although it is understood that one or more of these features may be incorporated therein.

In accordance with the present invention, the metal gas separation membranes 1204 are supported on the first and second mounting members 1264 and 1266. More specifically, the metal gas separation membranes 1204 are fixedly attached to the first and second mounting members 1264 and 1266 such as by welding or other appropriate attachment methodology.

By configuring the porous bodies of the metal gas separation membranes 1204 to be formed of metal instead of ceramic or other metallic oxide, the metal gas separation membranes 1204 can be welded to the metallic first and second mounting members 1264 and 1266. Such welded attachment is particularly advantageous because it overcomes the problems inherent in attempting to seal a joint between a ceramic member and a metallic member such as occurred with previously known ceramic support structures in previously known gas separation membranes.

Additionally, the metal gas separation membranes 1204 are less susceptible to thermal shock than ceramic members, and furthermore are not subject to configurational deformation problems that can plague ceramic members during firing operations.

As can be seen in FIG. 5, the first ends 1268 of the metal gas separation membranes 1204 are abuttingly and sealingly mounted to the first mounting member 1264, whereby the first ends 1268 are closed. In contrast thereto, the second ends 1270 are mounted adjacent holes 1276 formed in the second mounting member 1266, whereby the second ends 1270 are open. The first mounting member 1264 is formed with a plurality of perforations 1278 in the regions thereof that are not used for sealing the first ends 1268 of the metal gas separation membranes 1204.

The metal gas separation membranes 1204 each include a generally defined interior 1277 and a generally defined exterior 1279. The interior 1277 of each metal gas separation membrane 1204 is defined by the void 1274. The exterior 1279 is opposite the interior 1277 and is defined as being the regions that are disposed radially outwardly beyond the outermost components of the metal gas separation membranes 1204, whether the outermost components be the porous body, a layer of ceramic particles, a chemisorption-dissociation-diffusion coating, or a support member.

The first and second mounting members 1264 and 1266 define an inlet manifold 1282 therebetween that is disposed to the exterior 1279 of all of the metal gas separation membranes 1204. Stated otherwise, the inlet manifold 1282 is the portion of the core 1262 between the first and second mounting members 1264 and 1266 that is not occupied by the metal gas separation membranes 1204. Similarly, the second mounting member 1266 defines a permeate gas manifold 1284 extending from the side of the second mounting member 1266 opposite the inlet manifold 1282. Still similarly, the first mounting member 1264 defines a retentate manifold 1286 extending from the side of the first mounting member 1264 opposite the inlet manifold 1282. The permeate gas manifold 1284 and the retentate manifold 1286 are disposed within the core 1262.

The housing 1260 is additionally formed with a feed gas inlet 1288, a retentate gas outlet 1290, and a permeate gas outlet 1292. The permeate gas outlet 1292 is in fluid communication with the permeate gas manifold 1284. The retentate gas outlet 1290 is in fluid communication with the retentate manifold 1286. The feed gas inlet 1288 is in fluid communication with the inlet manifold 1282. Inasmuch as the first mounting member 1264 is formed with the perforations 1278, the feed gas inlet 1288 is additionally in fluid communication with the retentate manifold 1286 and the retentate gas outlet 1290 through the perforations 1278.

The gas separation module 1258 additionally includes a catalytic enhancement 1294. In the embodiment depicted in FIG. 5, the catalytic enhancement 1294 is disposed within the inlet manifold 1282 of the housing 1260, which is generally to the exterior 1279 of the metal gas separation membranes 1204. The catalytic enhancement 1294 is in the form of catalytic materials 1296 that are disposed on or are otherwise supported by a scaffold apparatus 1298. The catalytic materials 1296 may include any of the catalytic materials set forth herein.

The scaffold apparatus 1298 may be in the form of metal fibers, chemical vapor infiltration silicon carbide (CVI-SiC) reticulated foam, and the like. In this regard, if the scaffold apparatus 1298 is in the form of metal fibers, the catalytic materials 1296 may be plated onto the metal fibers, may be distributed throughout the fibers, or may themselves comprise the metal fibers that form the scaffold apparatus 1298. It is understood, however, that the catalytic enhancement 1294 within the inlet manifold 1282 may be of other configurations than that specifically set forth herein without departing from the concept of the present invention.

In operation, the feed gas stream 1208 flows through the feed gas inlet 1288 and into the inlet manifold 1282 where it flows into contact with the catalytic enhancement 1294. The catalytic enhancement 1294 promotes the water gas shift reaction, the ammonia decomposition reaction, and the like to increase the concentration or the availability of hydrogen within the feed gas stream 1208. The catalytic enhancement 1294 is advantageously configured to be highly porous and thus permit the free flow of the feed gas stream 1208 therethrough. Depending upon the specific makeup of the feed gas stream 1208 or the specific needs of the particular application, the gas separation module 1258 may be configured to not include the catalytic enhancement 1294.

The feed gas stream 1208 including gaseous hydrogen thereafter flows into contact with the metal gas separation membranes 1204. Hydrogen gas flows through the metal gas separation membranes 1204 from the exterior 1279 thereof to the interior 1277 thereof and along the voids 1274 to form the permeate gas stream 1226 which then flows into the permeate gas manifold 1284 and out of the permeate gas outlet 1292. The feed gas stream 1208 from which the hydrogen has been substantially removed flows through the perforations 1278 and into the retentate manifold 1286 where it forms the retentate gas stream 1261 that flows out of the retentate manifold 1286.

The perforations 1278 formed in the first mounting member 1264 help to retain the catalytic enhancement 1294 within the inlet manifold 1282 and additionally assist in maintaining the substantial pressure drop between the feed gas stream 1208 and the retentate gas stream 1261 that helps to drive the separation of the permeate gas stream 1226 from the feed gas stream 1208. Since the metal gas separation membranes 1204 and the first and second mounting members 1264 and 1266 are all manufactured substantially out of metal, the metal gas separation membranes 1204 can be welded to the first and second mounting members 1264 and 1266. Such sealing attachment additionally makes the gas separation module 1258 well suited to the elevated temperatures and pressures typically encountered in separating the permeate gas stream 1226 from the feed gas stream 1208.

By applying the relatively higher ambient pressure of the feed gas stream 1208 to the exterior 1279 of the metal gas separation membranes 1204, such relatively higher ambient pressure would have a tendency to seat a chemisorption-dissociation-diffusion coating and/or a layer of ceramic particles disposed at the first surface 1220 of the metal gas separation membrane 1204 against the first surface 1220. Additionally, the catalytic enhancement 1294 disposed within the inlet manifold 1282 increases the extent to which hydrogen can be generated and removed from the feed gas stream 1208.

Alternatively, if the metal gas separation membrane 1204 is configured to include a ceramic layer and/or chemisorption-dissociation-diffusion coating applied to the second surface 1224 instead of to the first surface 1220, the metal gas separation membrane 1204 would preferably include a support member within the interior 1277 and disposed against the ceramic layer or the chemisorption-dissociation-diffusion coating to resist the ceramic layer and/or the chemisorption-dissociation-diffusion coating from being blown off the second surface 1224 by the relatively higher ambient pressure applied to the first surface 1220. In such a configuration, the gas separation module 1258 may be configured to include a catalytic enhancement incorporated into the metal gas separation membranes 1204 themselves in a fashion similar to the metal gas separation membrane 1104. Such a catalytic enhancement incorporated into the metal gas separation membranes 1204 may take the place of the catalytic enhancement 1294, such that the gas separation module 1258 may be configured to not include the catalytic enhancement 1294.

Figure 6:
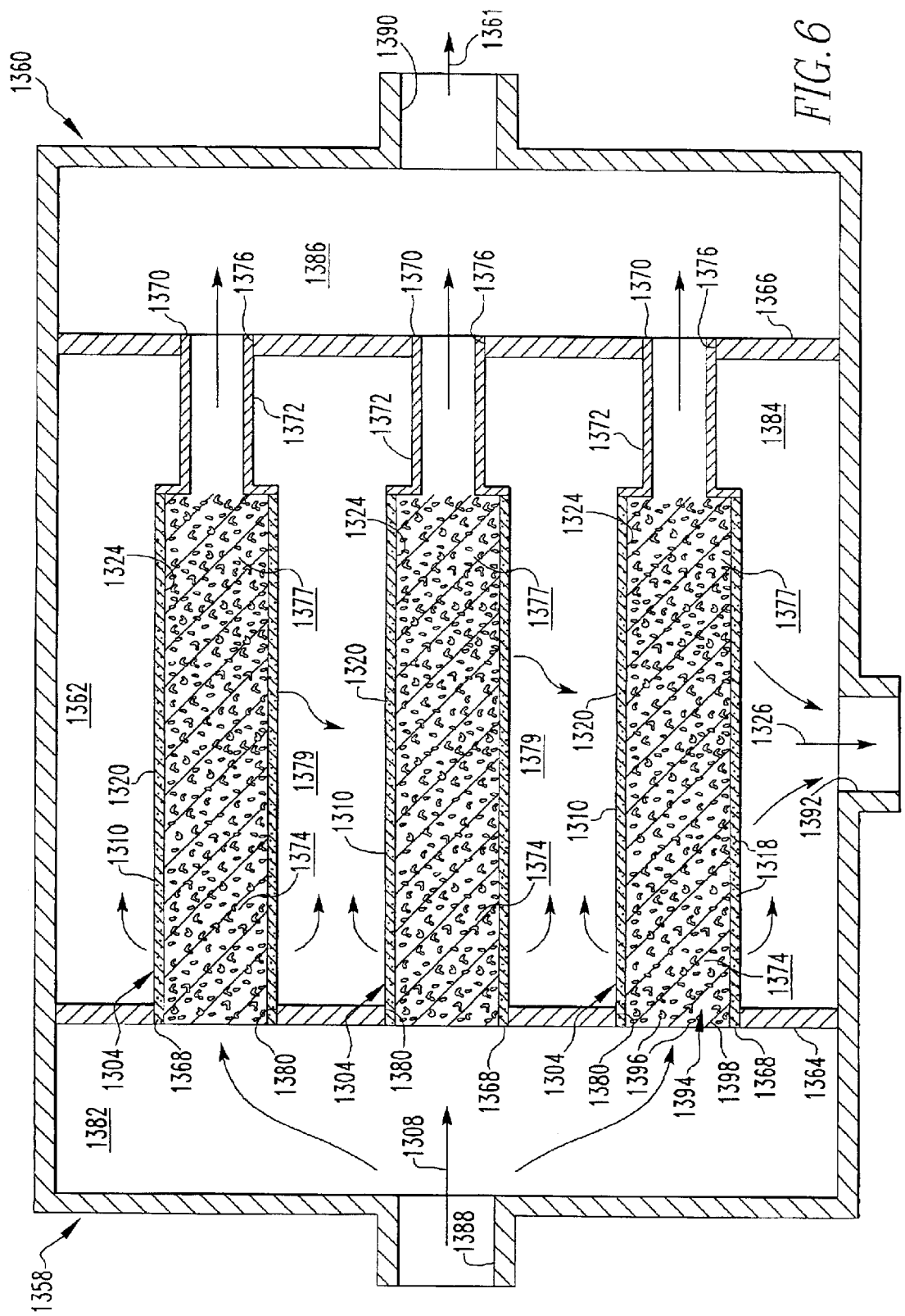
FIG. 6 is a schematic cross-sectional view of a second embodiment of a gas separation module in accordance with the present invention.

A second embodiment of a gas separation module 1358 in accordance with the present invention is indicated generally in FIG. 6. The gas separation module 1358 includes a housing 1360 and a plurality of metal gas separation membranes 1304 substantially disposed internally therein. The gas separation module 1358 is similar to the gas separation module 1258 in that the housing 1360 is formed with a core 1362 within which are disposed a first mounting member 1364 and a second mounting member 1366 in the form of tube sheets that support the metal gas separation membranes 1304. The gas separation module 1358 is different, however, in the way that the feed gas stream 1308 interacts with the metal gas separation membranes 1304 to form the permeate gas stream 1326 and the retentate gas stream 1361.

As can be seen in FIG. 6, the metal gas separation membranes 1304 each include a first end 1368 and a second end 1370, except that the second end 1370 is defined as the free end of a tube extension 1372 that extends from a porous body 1310 of the metal gas separation membranes 1304 and is connected with the second mounting member 1366. The tube extension 1372 has a relatively narrower hollow inner cavity than the void 1374 extending through the porous body 1310 of each metal gas separation membrane 1304. The metal gas separation membranes 1304 each include the porous body 1310 which has a first surface 1320 and a second surface 1324 opposite one another. The interior 1377 of each metal gas separation membrane 1304 is defined by the second surface 1324 and the void 1374 thereof, and the exterior 1379 is opposite thereto.

The first and second ends 1368 and 1370 of the metal gas separation membranes 1304 are open and the feed gas stream 1308 flows through the void 1374. In this regard, it can be seen that the first mounting member 1364 is formed with a plurality of openings 1380 to which the first ends 1368 are attached, such as via welding as set forth above. Similarly, the second mounting member 1366 is formed with a plurality of holes 1376 to which the second ends 1370 of the metal gas separation membranes 1304 are attached, such as via welding. As such, the first and second mounting members 1364 and 1366 define a permeate gas manifold therebetween that is flow communication with a permeate gas outlet 1392 formed in the housing 1316. The first mounting member 1364 defines an inlet manifold 1382 that is opposite the permeate gas manifold 1384 and that is in flow communication with a feed gas inlet 1388 formed in the housing 1360. Additionally, the second mounting member 1366 defines a retentate manifold 1386 that is opposite the permeate gas manifold 1384 and that is in flow communication with a retentate gas outlet 1390 formed in the housing 1360. Inasmuch as the metal gas separation membranes 1304 are sealingly attached to the first and second mounting members 1364 and 1366, the permeate gas manifold 1384 is configured to be free of leaks between it and either of inlet and retentate manifolds 1382 and 1386.

The gas separation module 1358 additionally includes a catalytic enhancement 1394 that is in the form of catalytic materials 1396 mounted on or otherwise disposed on a scaffold apparatus 1398 that is disposed within the voids 1374 of each of the metal gas separation membranes 1304. The relatively narrowed tube extension 1372 helps to retain the catalytic enhancement disposed within the porous body 1310, although it is understood that such function could be provided by a screen, a mesh, or other such structure.

The metal gas separation membranes 1304 may themselves include a catalytic enhancement in the form of particles of catalytic material 1318 (depicted as dots in FIG. 6) formed therewith. The catalytic materials 1396 and the particles of catalytic material 1318 can be made from any of the catalytic materials set forth herein. The catalytic enhancement 1394 depicted in FIG. 6 thus includes both the catalytic materials 1396 disposed on the scaffold apparatus 1398 as well as the particles of catalytic material 1318.

In operation, the feed gas stream 1308 flows through the feed gas inlet 1388 and into the inlet manifold 1382, after which it flows through the first ends 1368 of the metal gas separation membranes 1304 and into the voids 1374 thereof. The feed gas stream 1308 then interacts with the catalytic enhancement 1394 which increases the concentration and availability of hydrogen gas by promoting the water gas shift reaction, the ammonia decomposition reaction, and the like. Hydrogen gas flows through the second surface 1324 of each metal gas separation membrane 1304 in a direction toward the first surface 1320. Thereafter, hydrogen gas flows into the permeate gas manifold 1384 to form the permeate gas stream 1326 which flows out of the permeate gas outlet 1392. The portion of the feed gas stream 1308 from which the hydrogen has been substantially removed continues to flow through the tube extension 1372 and into the retentate manifold 1386 where it forms the retentate gas stream 1361 that flows out of the retentate gas outlet 1390.

If the metal gas separation membranes 1304 are configured to include the chemisorption-dissociation-diffusion coating 16, 1016, or 1116 applied to the second surface 1324 of each metal gas separation membrane 1304, the support member 1144 (not shown in FIG. 6) disposed against the chemisorption-dissociation-diffusion coating 16, 1016, or 1116 would provide a separation mechanism to facilitate insertion of the catalytic enhancement 1394 and to avoid damage to the chemisorption-dissociation-diffusion coating 16, 1016, or 1116. Should the chemisorption-dissociation-diffusion coating 16, 1016, or 1116 be applied to the first surface 1320 of each metal gas separation membrane 1304, a support member 1144 (not shown in FIG. 6) disposed against the chemisorption-dissociation-diffusion coating 16, 1016, or 1116 would advantageously resist the relatively higher ambient pressure applied to the second surface 1324 and retain the chemisorption-dissociation-diffusion coating and/or the layer of ceramic particles on the porous body to maintain the integrity of the metal gas separation membranes 1304 and to ensure the continued high purity of the permeate gas stream 1326.

Figure 7:
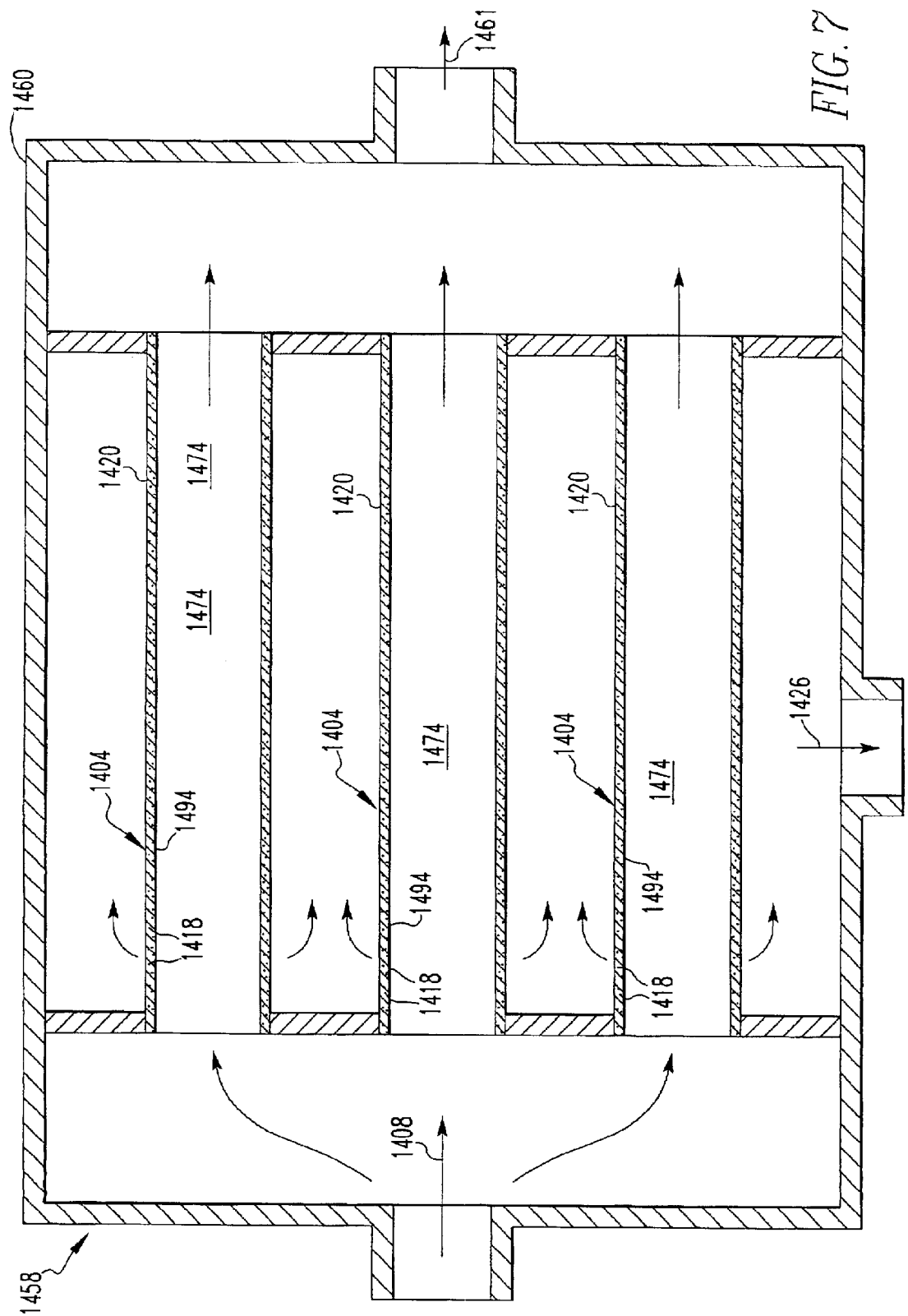
FIG. 7 is a schematic cross-sectional view of a third embodiment of a gas separation module in accordance with the present invention.

A third embodiment of a gas separation module 1458 in accordance with the present invention is indicated generally in FIG. 7. The gas separation module 1458 is similar to the gas separation module 1358 in that it includes a housing 1460 within which are disposed a plurality of metal separation membranes 1404 that have a flow pattern similar to that of the gas separation module 1358. The gas separation module 1458 is different, however, in that the catalytic enhancement 1494 thereof is limited to the particles of catalytic material 1418 (depicted as dots in FIG. 7) formed integrally with the metal gas separation membranes 1404 and does not include catalytic materials disposed on a scaffold apparatus within the voids 1474 of the metal gas separation membranes 1404. Additionally, the metal gas separation membranes 1404 do not include the relatively narrowed tube extensions 1372.

The feed gas stream 1408 flows into the voids 1474 of the metal gas separation membranes 1404 and catalytically interacts with the particles of catalytic material 1418 to increase the concentration and availability of hydrogen by promoting the water gas shift reaction, the ammonia decomposition reaction, and the like. The hydrogen in the feed gas stream 1408, meaning both the hydrogen initially present therein as well as that which was catalytically formed by the particles of catalytic material 1418, passes through the metal gas separation membranes 1404 via Knudsen Diffusion and chemisorption-dissociation-diffusion (if appropriate) to form the permeate gas stream 1426. The gas from which the hydrogen has been removed continues to flow along the voids 1474 to form the retentate gas stream 1461. The gas separation module 1458 is thus catalytically enhanced by specifically configuring the metal gas separation membranes 1404 thereof to provide such a feature. The chemisorption-dissociation-diffusion coating (not shown) would be disposed on a first surface 1420 of each metal gas separation membrane 1404, and an overlying support member (not shown) would enhance the structural integrity of each such chemisorption-dissociation-diffusion coating.

As indicated above, the metal gas separation membrane in its simplest form includes a porous body of metal particles having a constant porosity throughout. In addition thereto, the porosity of the porous body may vary from a first surface to a second opposite surface. Still alternatively, or in addition thereto, the porous body may include a layer of palladium, palladium-alloy, and the like which enhances gas phase chemisorption-dissociation-diffusion of hydrogen therethrough. Still alternatively, or in addition thereto, the porous body may include a coating in the form of a plurality of ceramic particles thereon that further reduce the porosity of the porous body. Still alternatively, or in addition thereto, the metal gas separation membrane may include a catalytic enhancement of various configurations. Still alternatively, or in addition thereto, the metal gas separation membrane may be mounted on a support structure to assist the metal gas separation membrane to withstand the operating pressures and temperatures of a particular application.

While a number of particular embodiments of the present invention have been described herein, it is understood that various changes, additions, modifications, and adaptations may be made without departing from the scope of the present invention, as set forth in the following claims.

What is claimed is:

1. A gas separation module for separating a permeation gas from a feed gas stream, the gas separation module comprising:
   at least a first gas separation membrane;
   a housing having a core and including a first mounting member and a second mounting member;
   the at least first gas separation membrane being supported by the first and second mounting members and being disposed substantially within the core of the housing;
   the at least first gas separation membrane including an elongated porous body of metal particles compacted and bonded together and a chemisorption-dissociation-diffusion coating, the porous body being formed with an elongated void, the metal particles including a quantity of at least one of metal fibers and metal powder;
   the porous body having a first surface and a second surface opposite one another, one of the first surface and the second surface being defined by the void of the porous body;
   the at least first gas separation membrane having an interior and an exterior, the interior being defined by the void of the porous body, the exterior being opposite the interior;
   the porosity of the porous body increasing from the first surface to the second surface; and
   the gas separation membrane being structured to receive the feed gas stream against one of the first and second surfaces and to permeate a quantity of the permeation gas out of the other of the first and second surfaces.

2. A gas separation module for separating a permeation gas from a feed gas stream, the gas separation module comprising:
   at least a first gas separation membrane;
   a housing having a core and including a first mounting member and a second mounting member;
   the at least first gas separation membrane being supported by the first and second mounting members and being disposed substantially within the core of the housing;
   the at least first gas separation membrane including an elongated porous body of metal particles compacted and bonded together, the porous body being formed with an elongated void, the metal particles including a quantity of at least one of metal fibers and metal powder;
   the porous body having a first surface and a second surface opposite one another, one of the first surface and the second surface being defined by the void of the porous body;
   the at least first gas separation membrane having an interior and an exterior, the interior being defined by the void of the porous body, the exterior being opposite the interior;
   the porosity of the porous body increasing from the first surface to the second surface;
   the gas separation membrane being structured to receive the feed gas stream against one of the first and second surfaces and to permeate a quantity of the permeation gas out of the other of the first and second surfaces; and
   in which the gas separation membrane is structured to receive the feed gas stream against the first surface and to permeate the quantity of the permeation gas out of the second surface, and in which the gas separation module includes a catalytic enhancement disposed to the exterior of the at least first gas separation membrane, the catalytic enhancement including a quantity of catalytic materials supported on a scaffold apparatus disposed to the exterior of the at least first gas separation membrane, and the scaffold apparatus being one of metal fibers and chemical vapor infiltration silicon carbide reticulated foam.

3. The gas separation module as set forth in claim 2, in which the housing includes a permeate gas outlet, and in which the at least first gas separation membrane has a first end and a second end, the first end being closed, and the second end being in fluid communication with the permeate gas outlet.

4. The gas separation module as set forth in claim 3, in which the catalytic enhancement is disposed between the first and second mounting members, and in which the housing includes a feed gas inlet and a retentate gas outlet, the feed gas inlet being in flow communication with the retentate gas outlet through the catalytic enhancement.

5. The gas separation module as set forth in claim 2, in which the at least first gas separation membrane includes chemisorption-dissociation-diffusion coating disposed on the first surface, the gas separation membrane being structured to receive the feed gas stream against the chemisorption-dissociation-diffusion coating and to permeate the quantity of the permeation gas out of the second surface.

6. A gas separation module for separating a permeation gas from a feed gas stream, the gas separation module comprising:
   at least a first gas separation membrane;
   a housing having a core and including a first mounting member and a second mounting member;
   the at least first gas separation membrane being supported by the first and second mounting members and being disposed substantially within the core of the housing;
   the at least first gas separation membrane including an elongated porous body of metal particles compacted and bonded together, the porous body being formed with an elongated void, the metal particles including a quantity of at least one of metal fibers and metal powder;
   the porous body having a first surface and a second surface opposite one another, one of the first surface and the second surface being defined by the void of the porous body;
   the at least first gas separation membrane having an interior and an exterior, the interior being defined by the void of the porous body, the exterior being opposite the interior;
   the porosity of the porous body increasing from the first surface to the second surface;
   the gas separation membrane being structured to receive the feed gas stream against one of the first and second surfaces and to permeate a quantity of the permeation gas out of the other of the first and second surfaces; and
   in which the gas separation membrane is structured to receive the feed gas stream against the second surface and to permeate the quantity of the permeation gas out of the first surface, and in which the gas separation module includes a catalytic enhancement, the catalytic enhancement including catalytic material incorporated into the porous body.

7. The gas separation module as set forth in claim 6, in which the housing includes a feed gas inlet and a retentate gas outlet, the feed gas inlet being in flow communication with the retentate gas outlet through the catalytic enhancement.

8. The gas separation module as set forth in claim 6, in which the housing includes a feed gas inlet and a retentate gas outlet, the at least first gas separation membrane having a first end and a second end, the feed gas inlet being in fluid communication with the retentate gas outlet through the first and second ends, the housing further including a permeate gas manifold and a permeate gas outlet, the permeate gas manifold being defined between the first and second mounting members, and the permeate gas outlet being in fluid communication with the exterior of the at least first gas separation membrane through the permeate gas manifold.

9. The gas separation module as set forth in claim 8, in which the at least first gas separation membrane includes a chemisorption-dissociation-diffusion coating disposed on the first surface, the gas separation membrane being structured to receive the feed gas stream against the second surface and to permeate the quantity of the permeation gas out of the chemisorption-dissociation-diffusion coating.

10. The gas separation module as set forth in claim 9, in which the at least first gas separation membrane includes a support member disposed against the chemisorption-dissociation-diffusion coating.

11. A gas separation module for separating a permeation gas from a feed gas stream, the gas separation module comprising:
    a gas separation membrane having a generally elongated porous body of dense metal particles, the porous body having a first surface and a second surface and a void formed between the first and second surfaces; and
    a housing having a core and including a mounting member, the gas separation membrane being supported by the mounting member and disposed substantially within the core; and
    the spacing between certain metal particles being larger than the spacing between other metal particles.

12. The gas separation module as set forth in claim 11, wherein the gas separation membrane is structured to receive the feed gas stream against one of the first and second surfaces and to permeate a quantity of the permeation gas out of the other of the first and second surfaces.

13. The gas separation module as set forth in claim 11, wherein the gas separation membrane has an interior and an exterior, the interior being defined by the void of the porous body, and the exterior being generally opposite the interior.

14. The gas separation module as set forth in claim 11, wherein the density of the metal particles is achieved by compressing and bonding the metal particles.

15. The gas separation module as set forth in claim 11, wherein the metal particles are selected from the group consisting of metal fibers and metal powders.

16. The gas separation module as set forth in claim 11, wherein the porosity of the porous body increases from the first surface to the second surface.

17. The gas separation module as set forth in claim 11, wherein the metal particles are configured in a variety of sizes.

18. The gas separation module as set forth in claim 11, wherein the gas separation membrane has a hollow, generally cylindrical configuration.

* * * * *